United States Patent
Arvan et al.

(10) Patent No.: US 8,220,264 B2
(45) Date of Patent: Jul. 17, 2012

(54) INTEGRATED INBOARD EXHAUST MANIFOLDS FOR V-TYPE ENGINES

(75) Inventors: Gary J. Arvan, Rochester Hills, MI (US); Charles E. Freese, V, Ira Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 11/402,614

(22) Filed: Apr. 12, 2006

(65) Prior Publication Data

US 2007/0056281 A1    Mar. 15, 2007

Related U.S. Application Data

(60) Provisional application No. 60/716,463, filed on Sep. 13, 2005.

(51) Int. Cl.
 F02B 33/44 (2006.01)
 F02B 33/00 (2006.01)
 F02F 11/00 (2006.01)
 F02F 3/00 (2006.01)

(52) U.S. Cl. .................. 60/605.1; 123/559.1; 123/193.3; 123/193.5

(58) Field of Classification Search ................ 123/193.3, 123/193.5, 559.1; 60/605.1, 604
See application file for complete search history.

(56) References Cited

U.S. PATENT DOCUMENTS

| | | | | |
|---|---|---|---|---|
| 2,739,440 A | * | 3/1956 | Reiter et al. ..................... | 60/599 |
| 3,257,797 A | * | 6/1966 | Lieberherr ....................... | 60/599 |
| 3,673,798 A | * | 7/1972 | Kuehl ........................... | 60/605.1 |
| 4,351,154 A | * | 9/1982 | Richter ......................... | 60/605.1 |
| 4,372,120 A | * | 2/1983 | Ford et al. ..................... | 60/605.1 |
| 4,432,205 A | * | 2/1984 | Inoue et al. .................... | 60/605.1 |
| 4,458,491 A | * | 7/1984 | Deutschmann ................. | 60/612 |
| 4,535,592 A | * | 8/1985 | Zinsmeyer ...................... | 60/597 |
| 4,807,436 A | * | 2/1989 | Deutschmann et al. ......... | 60/322 |
| 5,067,452 A | * | 11/1991 | Elsbett et al. .............. | 123/193.5 |
| 5,374,209 A | * | 12/1994 | Wagner ......................... | 440/89 J |
| 5,476,402 A | * | 12/1995 | Nakai et al. .................. | 440/88 R |
| 5,673,655 A | * | 10/1997 | Mishima ..................... | 123/54.4 |
| 5,893,783 A | * | 4/1999 | Hiraoka et al. ............. | 440/88 R |
| 5,911,608 A | * | 6/1999 | Nakayama et al. ......... | 440/89 R |
| 6,021,746 A | * | 2/2000 | Pyon ........................... | 123/18 A |

(Continued)

FOREIGN PATENT DOCUMENTS

JP     57024417 A    2/1982

*Primary Examiner* — Thomas Denion
*Assistant Examiner* — Cameron Setayesh
(74) *Attorney, Agent, or Firm* — Quinn Law Group, PLLC

(57) ABSTRACT

An internal combustion engine has a first and a second cylinder bank. The first and second cylinder banks are arranged such that they have less than a 180 degree included angle with respect to one another, thereby forming an inboard region or generally V-shaped cavity. A respective first and second cylinder head is mounted with respect to the first and second cylinder bank. Integrated within the first and second cylinder head is a first and second integrated exhaust manifold, respectively. The first and second integrated exhaust manifolds are provided on the engine in an "inboard" orientation, i.e. disposed on a side of their respective cylinder heads such that they are substantially adjacent to the generally V-shaped cavity. The first and second integrated exhaust manifold may operate to convey exhaust gases from the engine to at least one turbocharger, which is mounted substantially within the generally V-shaped cavity.

11 Claims, 2 Drawing Sheets

U.S. PATENT DOCUMENTS

| | | | |
|---|---|---|---|
| 6,055,970 A | 5/2000 | Takahashi | 123/672 |
| 6,155,895 A * | 12/2000 | Sato et al. | 440/88 R |
| 6,305,168 B1 * | 10/2001 | Furukawa | 60/605.1 |
| 6,425,360 B1 * | 7/2002 | Kashima | 123/90.31 |
| 6,471,559 B2 * | 10/2002 | Kashima | 440/88 G |
| 6,513,506 B1 * | 2/2003 | Ito et al. | 123/568.13 |
| 7,047,739 B2 * | 5/2006 | Fledersbacher et al. | 60/602 |
| 7,089,737 B2 * | 8/2006 | Claus | 60/605.1 |
| 7,367,294 B2 * | 5/2008 | Rozario et al. | 123/41.82 R |
| 7,377,251 B2 * | 5/2008 | Wizgall et al. | 123/196 W |
| 2005/0144946 A1 * | 7/2005 | Claus | 60/605.1 |

\* cited by examiner

INTEGRATED INBOARD EXHAUST MANIFOLDS FOR V-TYPE ENGINES

CROSS-REFERENCE TO RELATED APPLICATIONS

This application claims the benefit of U.S. Provisional Application 60/716,463, filed Sep. 13, 2005, which is hereby incorporated by reference in its entirety.

TECHNICAL FIELD

The present invention relates to cylinder heads for an internal combustion engine, and more particularly, to a cylinder head configuration having an integrated exhaust manifold.

BACKGROUND OF THE INVENTION

A typical over-head valve internal combustion engine includes a cylinder case defining at least one cylinder bore having a piston reciprocally movable therein. The piston and the cylinder bore cooperate with a cylinder head to form a variable volume combustion chamber. The cylinder head defines intake ports through which air, provided by an intake manifold, is selectively introduced to the combustion chamber. Additionally, the cylinder head defines exhaust ports through which exhaust gases or products of combustion are selectively evacuated from the combustion chamber. Typically, an exhaust manifold is affixed, by bolting or other fastening method, to the cylinder head such that the exhaust manifold communicates with each exhaust port to carry the exhaust gases from the internal combustion engine to a vehicular exhaust system for subsequent release to the atmosphere. Many aspects are considered when designing an exhaust manifold such as packaging constraints, weight, cost, flow performance, and durability. Durability may be a concern since the exhaust manifold and the head to which it is affixed are typically dissimilar metals with differing rates of thermal expansion. The differing rates of thermal expansion may cause stresses within both the cylinder head and the exhaust manifold.

Some modern internal combustion engines may employ a turbocharger. The turbocharger has a turbine portion and a compressor portion. The turbine portion has a turbine housing, which is in communication with the exhaust manifold. The turbine housing directs the heat, noise, and kinetic energy of the flowing exhaust stream to spin a turbine blade. The turbine blade is rigidly mounted to a compressor blade for unitary rotation therewith. As the compressor blade spins, the air is compressed within a compressor housing. The compressed air is subsequently introduced to the intake manifold to increase the volumetric efficiency of the internal combustion engine. To maximize the performance of the turbocharger, engine designers typically mount the turbine housing as close to the exhaust port as possible so that the heat energy that might otherwise be used to spin the turbine blade is not wasted through radiation to the atmosphere.

SUMMARY OF THE INVENTION

An internal combustion engine is provided having a cylinder case with a first and a second bank of cylinder bores. The first and the second bank of cylinder bores each have at least one cylinder bore defined therein. The first and the second bank of cylinder bores are disposed with respect to one another such that they form an included angle of less than 180 degrees, thereby defining a generally V-shaped cavity. Also provided is a first integral exhaust manifold formed integrally with a first cylinder head and a second integral exhaust manifold formed integrally with a second cylinder head. The first and second integral exhaust manifolds are substantially adjacent to the generally V-shaped cavity.

The internal combustion engine of the preset invention may be a spark ignited engine or a compression ignited engine. Additionally, one or multiple turbochargers may be positioned with respect to at least one of the first and second integral exhaust manifolds such that the turbocharger is positioned generally within the generally V-shaped cavity.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
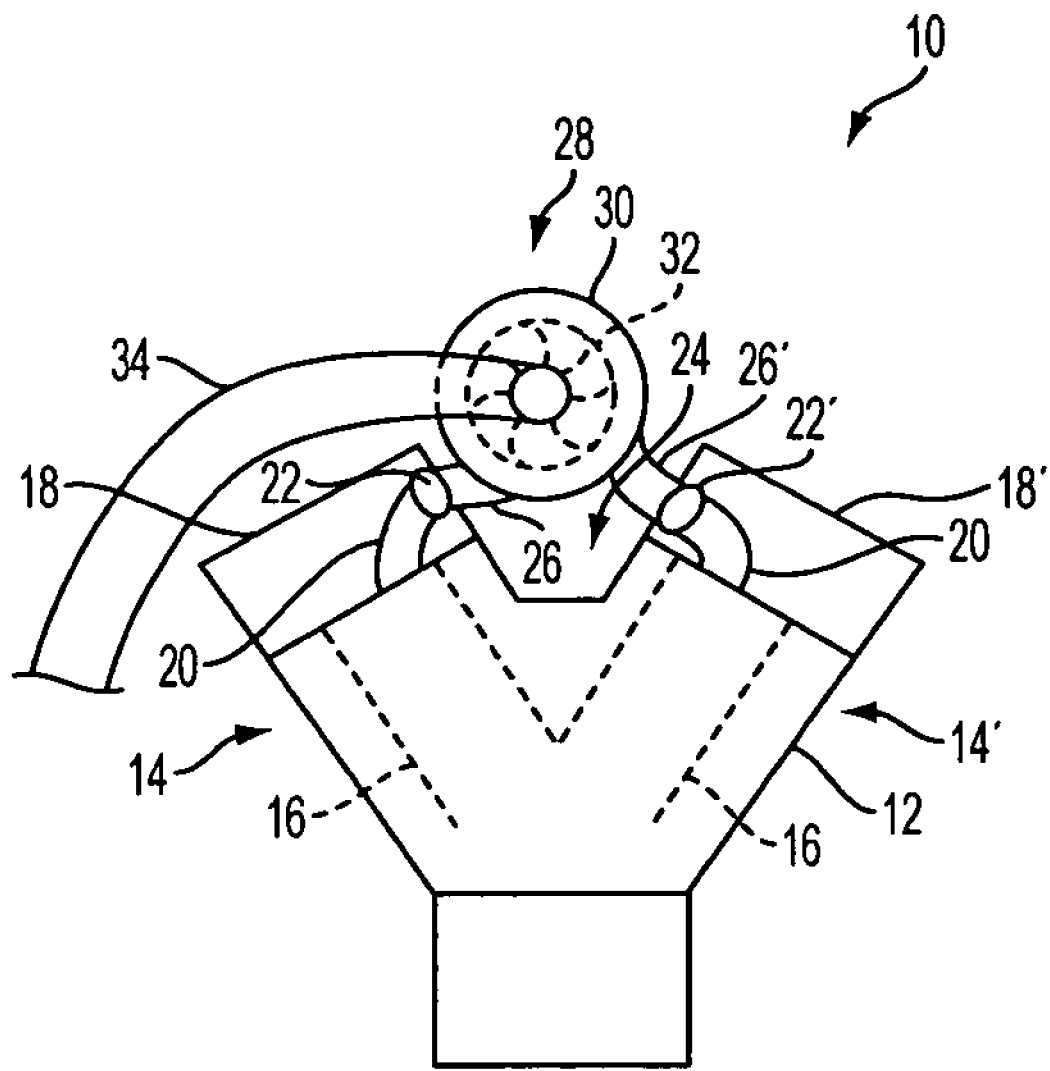
FIG. 1 is a schematic rear view of a V-type internal combustion engine having exhaust manifolds integrated into the cylinder heads in an inboard configuration.

Referring to the figures wherein like reference numbers refer to corresponding parts throughout the several views, there is shown in FIG. 1 an internal combustion engine, generally indicated at 10. The internal combustion engine 10 may operate in a compression ignited or spark ignited combustion mode, both of which are known to those skilled in the art. The internal combustion engine 10 has a cylinder case 12 with a generally V-type configuration. In a V-type configuration, a first and a second bank of cylinder bores 14 and 14', respectively, of the cylinder case 12 are disposed with an included angle of less than 180 degrees relative to one another. Those skilled in the art will recognize that each of the first and second banks of cylinder bores 14 and 14' may each contain one or a plurality of cylinder bores 16, shown in phantom. A first and second cylinder head 18 and 18' are mounted with respect to the first and second bank of cylinder bores 14 and 14', respectively.

Each of the first and second cylinder heads 18 and 18' define a plurality of exhaust ports 20 through which exhaust gases or products of combustion are selectively evacuated from the respective cylinder bore 16. The exhaust ports 20 communicate exhaust gases—such as through respective first and second exhaust runners—to a respective one of first and second integral exhaust manifold 22 and 22', each defined within the first and second cylinder head 18 an 18', respectively. The first and second integral exhaust manifolds 22 and 22' are formed integrally with the respective first and second cylinder heads 18 and 18', thereby obviating the need for fasteners and gaskets typically needed for exhaust manifold attachment. The first and second exhaust runners are portions of the exhaust ports 20 connecting each of the exhaust ports 20 in the first and second cylinder heads 18 and 18' and the respective first and second integral exhaust manifolds 22 and 22'. Since the integrated exhaust manifolds 22 and 22' are formed integrally with the cylinder heads 18 and 18', respectively, the potential exhaust gas leak paths during operation of the internal combustion engine 10 are reduced.

The first and second integral exhaust manifolds 22 and 22' are positioned on the internal combustion engine 10 such that they discharge exhaust gases in an inboard configuration, i.e. the first and second integral exhaust manifolds 22 and 22' are substantially adjacent to an inboard region or a generally V-shaped cavity 24. The inboard discharge configuration is beneficial in that the packaging requirement of the engine 10 may be reduced. The integral exhaust manifolds 22 and 22' may discharge in any orientation within the general area defined by the cavity 24 while remaining within the scope of that which is claimed. A respective first and second discharge conduit or pipe 26 and 26' are in fluid communication with the first and second integral exhaust manifolds 22 and 22', respectively.

The internal combustion engine 10 also includes a turbocharger 28. The turbo charger 28 includes a turbine housing 30 into which the first and second discharge pipes 26 and 26' communicate exhaust gases. Those skilled in the art will recognize that the first and second discharge pipes 26 and 26' may be eliminated by incorporating the first and second discharge pipes 26 and 26' into the turbine housing 30. The heat, noise, and kinetic energy of the exhaust gases cause a turbine blade 32, shown in phantom in FIG. 1, to spin or rotate within the turbine housing 30. When the useful energy is removed by the turbocharger 28, the exhaust gases are communicated to a discharge pipe 34 for subsequent release to the atmosphere. The inboard configuration of the first and second integral exhaust manifolds 22 and 22' permit the length of the first and second discharge pipes 26 and 26' to be minimized. By minimizing the length of the first and second discharge pipes 26 and 26', the heat energy of the exhaust gases may be retained to rotate the turbine blade 32. This heat energy would otherwise be lost to the atmosphere through heat transfer. Those skilled in the art will recognize that the present invention may incorporate a single turbocharger 28, twin turbochargers, or staged turbochargers.

Figure 2:
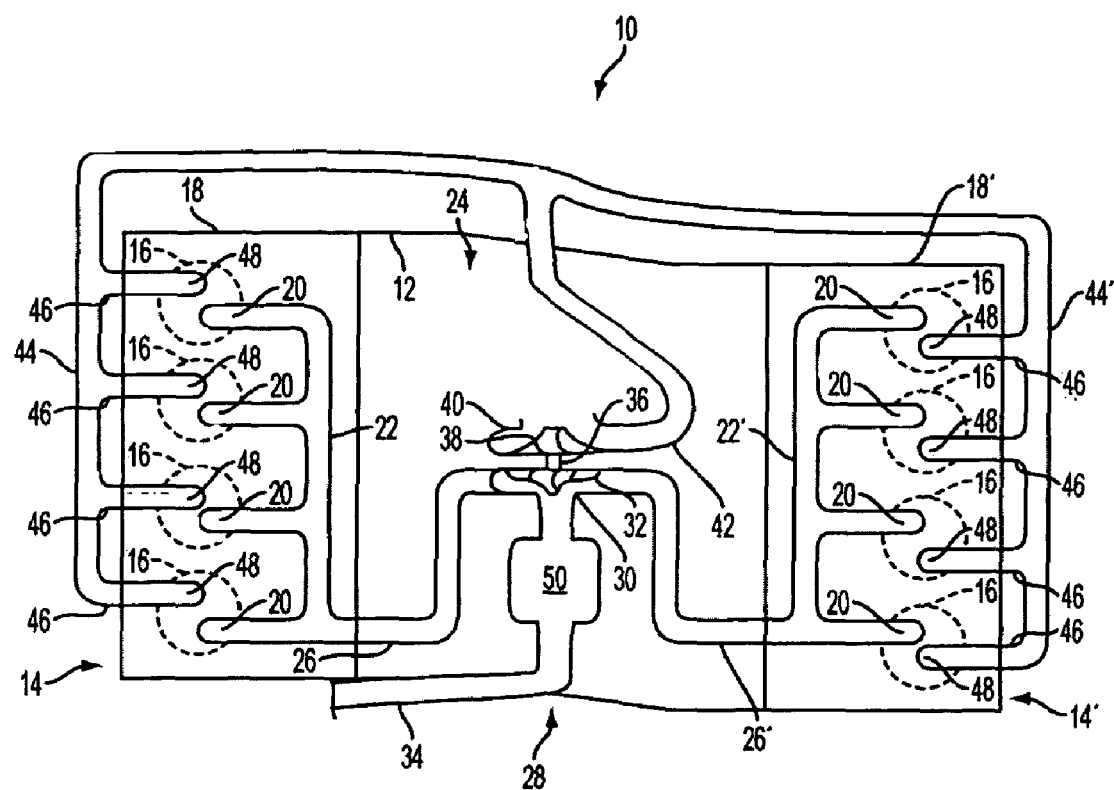
FIG. 2 is a schematic top view of the V-type internal combustion engine shown in FIG. 1.

Referring to FIG. 2, there is shown a top schematic view of the internal combustion engine 10 shown in FIG. 1. As shown, the turbine blade 32 is rigidly connected, through a shaft 36, to a compressor blade 38 for unitary rotation therewith. The rotating compressor blade 38 cooperates with a compressor housing 40 to induct air at generally atmospheric pressure and subsequently compress the air. The air is communicated to a compressor outlet duct 42, which is in communication with a first and second intake manifold 44 and 44', respectively. The first and second intake manifolds 44 and 44' distributes the air to one of a plurality of intake runners 46 that are in fluid communication with a respective one of a plurality of intake ports 48 defined by each of the first and second cylinder heads 18 and 18'. The intake ports 48 selectively introduce air to a respective one of the plurality of cylinder bores 16 where it, along with a fuel charge, is subsequently combusted in a known fashion.

The internal combustion engine may further include an aftertreatment device 50, such as an exhaust gas catalyst and/or particulate trap, disposed within the V-shaped cavity 24 and in downstream flow relation to the turbocharger 28. The compact arrangement of the integrated exhaust manifolds 22 and 22' allows the packaging of the aftertreatment device 50 closely coupled to the internal combustion engine 10. While the internal combustion engine 10 shown in FIGS. 1 and 2 includes the turbocharger 28, those skilled in the art will recognize that the turbocharger 28 may or may not be present while remaining within the inventive concept. Additionally, the intake ports 48 may be provided on either the inboard side of the cylinder heads 18 and 18' or the outboard side of the cylinder heads 18 and 18', as shown in FIG. 2.

While the best modes for carrying out the invention have been described in detail, those familiar with the art to which this invention relates will recognize various alternative designs and embodiments for practicing the invention within the scope of the appended claims.

The invention claimed is:

1. An internal combustion engine comprising:
   a cylinder case having a first and a second bank of cylinders, said first and said second bank of cylinders each having at least one cylinder bore defined therein;
   wherein said first and said second bank of cylinders respectively include first and second cylinder heads attached thereto, and said first and second bank of cylinders are disposed with respect to one another such that they form an included angle of less than 180 degrees, thereby defining a generally V-shaped cavity;
   a first integral exhaust manifold defined by said first cylinder head substantially adjacent to said V-shaped cavity, wherein said first integral exhaust manifold and said first cylinder head form a one-piece structure and the first integral exhaust manifold is in fluid communication with the first bank of cylinders;
   a second integral exhaust manifold defined by said second cylinder head substantially adjacent to said V-shaped cavity, wherein said second integral exhaust manifold and said second cylinder head form a one-piece structure and the second integral exhaust manifold is in fluid communication with the second bank of cylinders;
   first and second exhaust discharges defined by said first and second cylinder heads, respectively, within said V-shaped cavity, wherein said first and second exhaust discharges are in fluid communication with said respective first and second integral exhaust manifolds;
   a first discharge pipe in fluid communication with said first exhaust discharge, and a second discharge pipe in fluid communication with said second exhaust discharge;
   at least one turbocharger disposed at least partially within said V-shaped cavity and including a turbine housing in fluid communication with said first discharge pipe and in fluid communication with said second discharge pipe, wherein said first and second discharge pipes and said turbine housing are integrally formed as a one-piece structures;
   a first intake manifold operable to communicate intake air to said first cylinder head, and defining a first plurality of intake runners;
   a second intake manifold operable to communicate intake air to said second cylinder head, and defining a second plurality of intake runners;
   wherein said first intake manifold is mounted with respect to said first cylinder head opposite said first exhaust manifold;
   wherein said second intake manifold is mounted with respect to said second cylinder head opposite said second exhaust manifold; and
   wherein said first plurality of intake runners are offset from said second plurality of intake runners, and wherein said first plurality of exhaust runners are substantially aligned with said second plurality of exhaust runners.

2. The internal combustion engine of claim 1, wherein the internal combustion engine operates in a compression ignited combustion mode.

3. The internal combustion engine of claim 1, wherein the internal combustion engine operates in a spark ignited combustion mode.

4. An internal combustion engine comprising:
   a cylinder case having a first and a second bank of cylinders, said first and said second bank of cylinders each having at least one cylinder bore defined therein;

wherein said first and said second bank of cylinders are disposed with respect to one another such that they form an included angle of less than 180 degrees, thereby defining a generally V-shaped cavity, and wherein said first and said second bank of cylinders are offset relative to each other;

a first cylinder head mounted with respect to said first bank of cylinders, said first cylinder head defining a first plurality of exhaust runners;

a first exhaust manifold formed integrally with said first cylinder head and in communication with said first plurality of exhaust runners;

a second cylinder head mounted with respect to said second bank of cylinders, said second cylinder head defining a second plurality of exhaust runners;

a second exhaust manifold formed integrally with said second cylinder head and in communication with said second plurality of exhaust runners;

wherein said first and said second exhaust manifolds are juxtaposed with respect to, and further define, said generally V-shaped cavity;

at least one turbocharger;

said at least one turbocharger being disposed at least partially within said generally V-shaped cavity, said at least one turbocharger being operable to receive exhaust gases from at least one of said first and said second integral exhaust manifold;

an aftertreatment device disposed within said generally V-shaped cavity and operable to receive exhaust gases from said at least one turbocharger;

a first intake manifold operable to communicate intake air to said first cylinder head, and defining a first plurality of intake runners;

a second intake manifold operable to communicate intake air to said second cylinder head, and defining a second plurality of intake runners;

wherein said first intake manifold is mounted with respect to said first cylinder head opposite said first exhaust manifold;

wherein said second intake manifold is mounted with respect to said second cylinder head opposite said second exhaust manifold; and wherein said first plurality of intake runners are offset from said second plurality of intake runners, and wherein said first plurality of exhaust runners are substantially aligned with said second plurality of exhaust runners.

5. The internal combustion engine of claim 4, wherein the internal combustion engine operates in a compression ignited combustion mode.

6. The internal combustion engine of claim 4, wherein the internal combustion engine operates in a spark ignited combustion mode.

7. An internal combustion engine comprising:

a cylinder case having a first and a second bank of cylinders, said first and said second bank of cylinders each having at least one cylinder bore defined therein;

wherein said first and said second bank of cylinders are disposed with respect to one another such that they form an included angle of less than 180 degrees, thereby defining a generally V-shaped cavity;

a first cylinder head mounted with respect to said first bank of cylinders, said first cylinder head defining a first plurality of exhaust runners;

a first integral exhaust manifold formed integrally with said first cylinder head and in communication with said first plurality of exhaust runners;

wherein said first integral exhaust manifold and said first cylinder head form a one-piece structure;

a second cylinder head mounted with respect to said second bank of cylinders, said second cylinder head defining a second plurality of exhaust runners;

a second integral exhaust manifold formed integrally with said second cylinder head and in communication with said second plurality of exhaust runners;

wherein said second integral exhaust manifold and said second cylinder head form a one-piece structure;

wherein said first and said second cylinder head further define said generally V-shaped cavity;

at least one turbocharger having a turbine housing defining a first port and a second port, and disposed at least partially within said generally V-shaped cavity, said at least one turbocharger being operable to receive exhaust gases from at least one of said first and said second integral exhaust manifold;

a first discharge pipe in fluid communication with said first integral exhaust manifold and said first port of said turbocharger;

a second discharge pipe in fluid communication with said second integral exhaust manifold and said second port of said turbocharger;

an aftertreatment device disposed within said generally V-shaped cavity and operable to receive exhaust gases from said at least one turbocharger; and wherein at least one of said first and said second exhaust manifolds are substantially adjacent to said generally V-shaped cavity;

a first intake manifold operable to communicate intake air to said first cylinder head, and defining a first plurality of intake runners;

a second intake manifold operable to communicate intake air to said second cylinder head, and defining a second plurality of intake runners;

wherein said first intake manifold is mounted with respect to said first cylinder head opposite said first exhaust manifold;

wherein said second intake manifold is mounted with respect to said second cylinder head opposite said second exhaust manifold; and wherein said first plurality of intake runners are offset from said second plurality of intake runners, and wherein said first plurality of exhaust runners are substantially aligned with said second plurality of exhaust runners.

8. The internal combustion engine of claim 7, wherein the internal combustion engine operates in a compression ignited combustion mode.

9. The internal combustion engine of claim 7, wherein the internal combustion engine operates in a spark ignited combustion mode.

10. The internal combustion engine of claim 1, further comprising an aftertreatment device disposed within said generally V-shaped cavity and in fluid flow communication with said first integral exhaust manifold and said second integral exhaust manifold.

11. The internal combustion engine of claim 7, wherein said first and second discharge pipes and said turbine housing are integrally formed as a one-piece structure.

* * * * *